(12) United States Patent
Rajapa et al.

(10) Patent No.: US 11,455,101 B2
(45) Date of Patent: Sep. 27, 2022

(54) MANAGING I/O CONNECTIVITY ISSUES

(71) Applicant: EMC IP Holding Company LLC, Hopkinton, MA (US)

(72) Inventors: Alan Rajapa, North Smithfield, RI (US); Scott Rowlands, Marietta, GA (US); Erik P. Smith, Douglas, MA (US); Igor Fradkin, Sharon, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 17/037,814

(22) Filed: Sep. 30, 2020

(65) Prior Publication Data
US 2022/0100394 A1 Mar. 31, 2022

(51) Int. Cl.
*G06F 3/06* (2006.01)
*G06F 11/30* (2006.01)

(52) U.S. Cl.
CPC ............ *G06F 3/0619* (2013.01); *G06F 3/061* (2013.01); *G06F 3/067* (2013.01); *G06F 3/0635* (2013.01); *G06F 3/0653* (2013.01); *G06F 3/0659* (2013.01); *G06F 11/3034* (2013.01); *G06F 11/3041* (2013.01)

(58) Field of Classification Search
CPC ...... G06F 3/0619; G06F 3/061; G06F 3/0635; G06F 3/0653; G06F 3/0659; G06F 3/067; G06F 11/3034; G06F 11/3041
See application file for complete search history.

(56) References Cited

U.S. PATENT DOCUMENTS

| 7,730,201 | B1 * | 6/2010 | McAllister | H04L 12/5602 709/239 |
| 8,441,922 | B1 * | 5/2013 | McGlaughlin | H04L 49/357 710/32 |
| 2005/0108444 | A1 * | 5/2005 | Flauaus | H04L 41/0893 710/15 |
| 2015/0103659 | A1 * | 4/2015 | Iles | H04L 47/12 370/235 |

OTHER PUBLICATIONS

U.S. Appl. No. 16/927,045, filed Jul. 13, 2020, Davidson, et al.

* cited by examiner

*Primary Examiner* — Hiep T Nguyen
(74) *Attorney, Agent, or Firm* — Muirhead and Saturnelli, LLC

(57) ABSTRACT

Information pertinent to a connectivity issue reported by a switch may be determined, compiled and reported; and action may be taken autonomously to address the connectivity issue based on the information. The additional information may be determined by the storage system, including querying a switch in response to the switch notifying the storage system of the I/O error, and the storage system accessing one or more data structures to determine additional information. The storage system may cause I/O communications on the I/O path to be at least temporarily diverted. For example, in response to receiving an I/O request on the I/O path corresponding to the connectivity issue, the storage system may send a communication to the host system that causes the host system not to send additional I/O requests on the I/O path, at least temporarily, as described in more detail elsewhere herein.

20 Claims, 8 Drawing Sheets

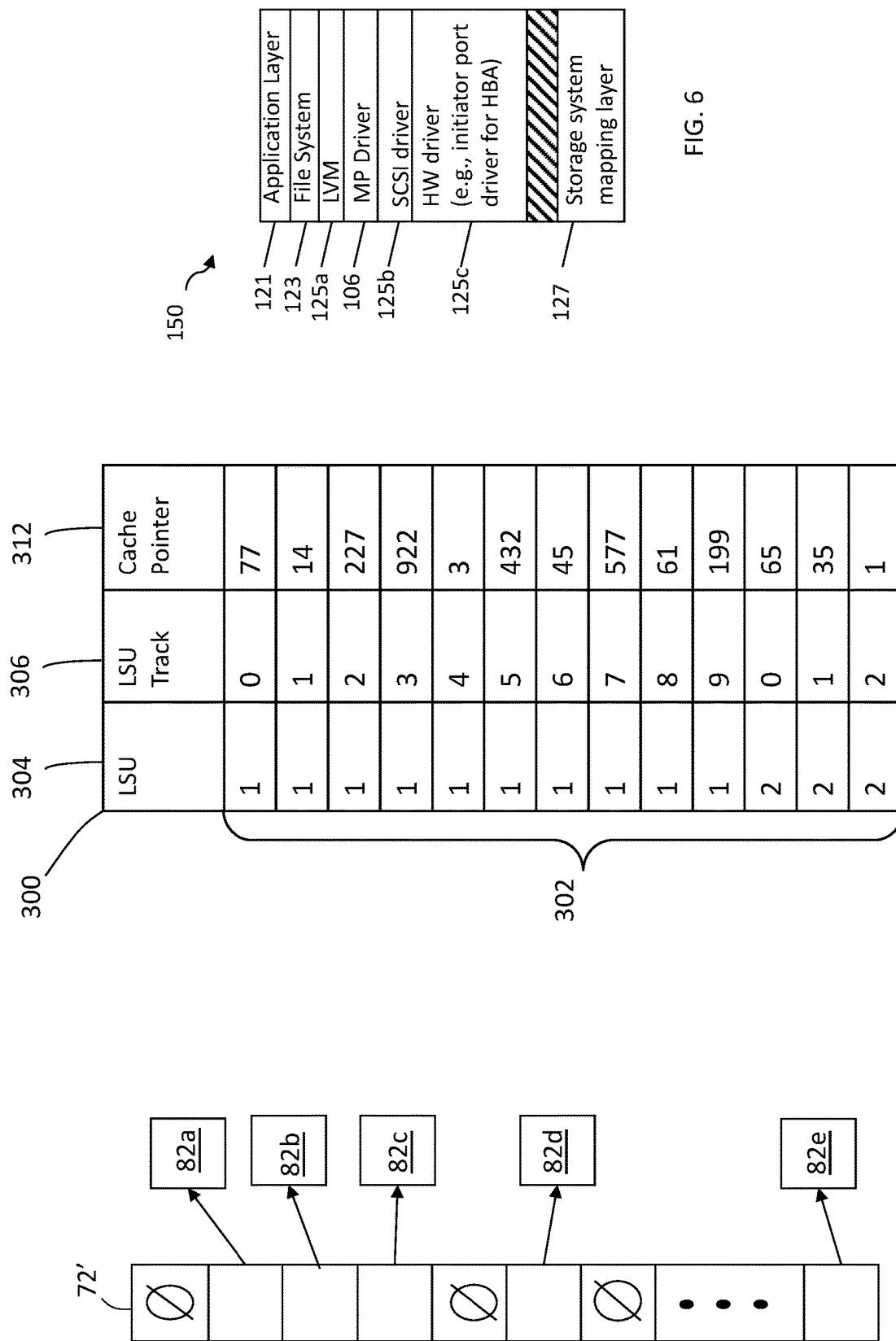

MANAGING I/O CONNECTIVITY ISSUES

BACKGROUND

Technical Field

This application generally relates to data storage systems, and more particularly to managing I/O connectivity issues for a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switch and storage system over which I/O operations between an application and storage device can be communicated may be considered an I/O path between the application and the storage device. These I/O paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

There may exist multiple I/O paths between a storage system and a host system across a switch that couples the storage system to the host system. Each I/O path may include an initiator and a target, where the initiator is a port of the host system, i.e., a host port, and each target is a port of a storage system, i.e., a storage system port, which may be referred to herein as a front-end port (FEP) as described in more detail elsewhere herein. Each host port (initiator) may be connected by a single physical link (e.g., an electrical or fiber optic cable) to a single dedicated port of the switch referred to herein as a switch host port (SHP) or fabric port, and each FEP (target) may be connected by a single physical link to a single dedicated port of the switch referred to herein as a switch storage port (SSP), as described in more detail herein. While a switch includes many possible physical paths between an SHP and SSP, a zoning table (described in more detail elsewhere herein) or the like may define the permissible or zoned paths between SHPs and SSPs of the switch. As each SHP is dedicated to a host port (initiator) and each SSP is dedicated to an FEP (target), a zone path may be defined in terms of an initiator-target (I-T) pair.

SUMMARY OF THE INVENTION

In some embodiments of the invention, a method is performed for a data storage network including a host system, a switch and a data storage system. The method include: receiving at the storage system a notification from the switch specifying a connectivity issue associated with I/O communications between the storage system and the host system; querying the switch for additional information pertaining to the connectivity issue; receiving from the switch the additional information pertaining to the connectivity issue; compiling the additional information into issue report information; and communicating the issue report information to a user of the data storage network. The method of claim 1, further may include, for an I/O path between the host system and the storage system, associated with the connectivity issue, the storage system causing I/O communication on the IO path to be at least temporarily diverted to another I/O path based on the connectivity issue and additional information. The storage system causing I/O communication on the I/O path to be diverted may include the storage system sending predefined check condition status code in accordance with SCSI technology to the host system in response to an I/O communication. The additional information may include a negotiated speed of at least one of: a host system port; and a storage system port. The additional information may include an identifier of a fabric/VSAN on an I/O path between the host system and the storage system associated with the connectivity issue. The additional information may include an identifier of a host port on an I/O path between the host system and the storage system associated with the connectivity issue. The storage system controls performance of the querying, the determining and the communicating.

In other embodiments of the invention, a data storage system of a data storage network including a host system, a switch and the data storage system. The data storage system includes executable logic that implements a method including: receiving at the storage system a notification from the switch specifying a connectivity issue associated with I/O communications between the storage system and the host system; querying the switch for additional information pertaining to the connectivity issue; receiving from the switch the additional information pertaining to the connectivity issue; compiling the additional information into issue report information; and communicating the issue report information to a user of the data storage network. The method further may include, for an I/O path between the host system and the storage system, associated with the connectivity issue, the storage system causing I/O communication on the IO path to be at least temporarily diverted to another I/O path based on the connectivity issue and additional information. The storage system causing I/O communication on the I/O path to be diverted may include the storage system sending predefined check condition status code in accordance with SCSI technology to the host system in response to an I/O communication. The additional information may include a negotiated speed of at least one of: a host system port; and a storage system port. The additional information may include an identifier of a fabric/VSAN on an I/O path between the host system and the storage system associated with the connectivity issue. The additional information may include an identifier of a host port on an I/O path between the host system and the storage system associated with the connectivity issue.

In other embodiments of the invention, a computer-readable media having software stored thereon may be provided for a data storage network including a host system, a switch and a data storage system. The software includes: executable code that controls the storage system to receive a notification from the switch specifying a connectivity issue associated with I/O communications between the storage system and the host system; executable code that queries the switch for additional information pertaining to the issue; executable code that receives from the switch the additional information pertaining to the issue; executable code that compiles the additional information into issue report information; and executable code that communicates the issue report information to a user of the data storage network. The software further may include, for an I/O path between the host system and the storage system, associated with the connectivity issue, the storage system causing I/O communication on the IO path to be at least temporarily diverted to another I/O path based on the connectivity issue and additional information. The storage system causing I/O communication on the I/O path to be diverted may include the storage system sending predefined check condition status code in accordance with SCSI technology to the host system in response to an I/O communication. The additional information may include a negotiated speed of at least one of: a host system port; and a storage system port. The additional information may include an identifier of a fabric/VSAN on an I/O path between the host system and the storage system associated with the connectivity issue. The additional information may include an identifier of a host port on an I/O path between the host system and the storage system associated with the connectivity issue. The executable code that queries, the executable code that determines and the executable code that communicates may be executed on the data storage system.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

DETAILED DESCRIPTION OF EMBODIMENTS

Figure 1:
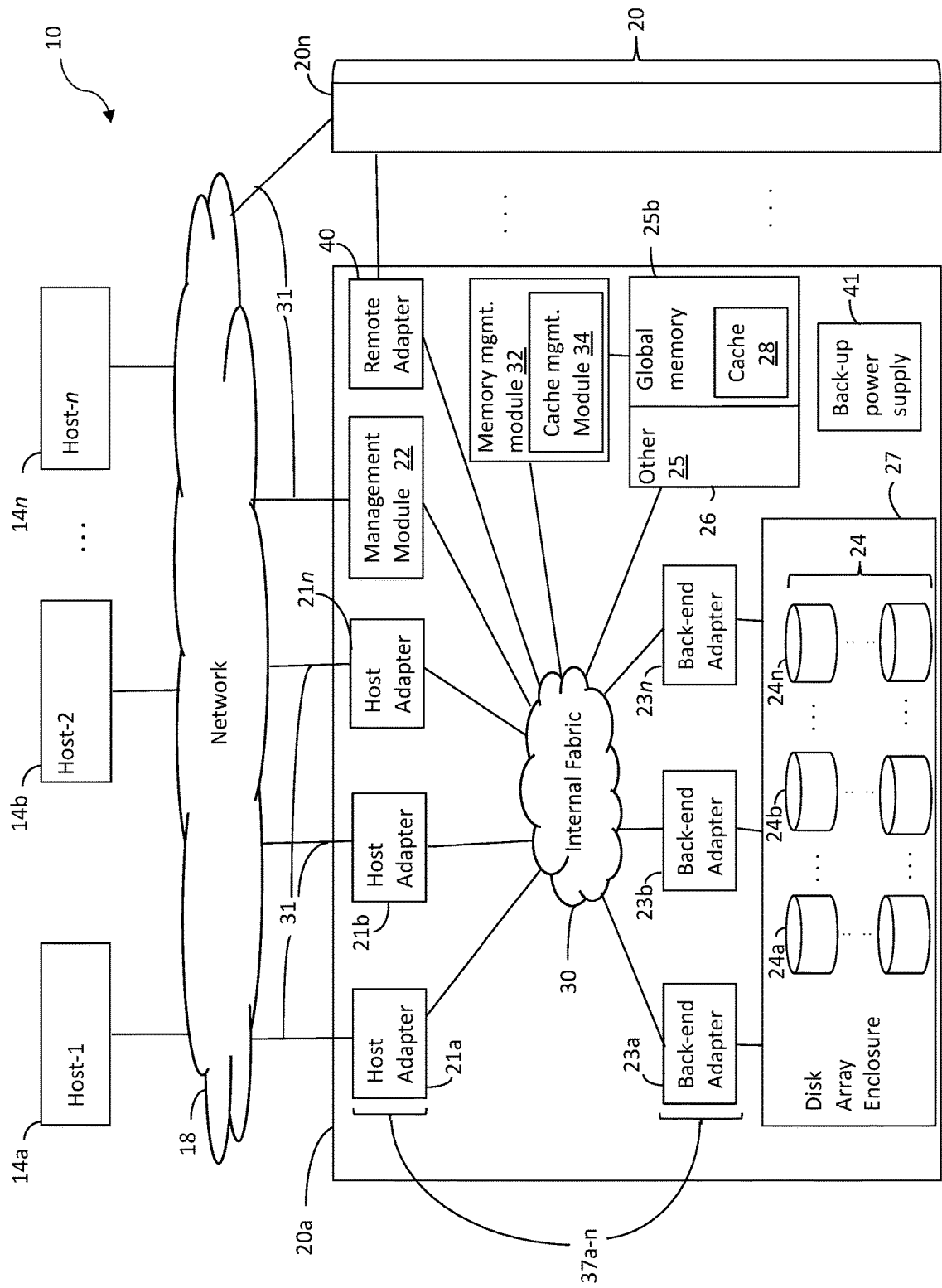
FIG. 1 is a block diagram illustrating an example of a data storage network, according to embodiments of the invention.

A switch of a data storage network may be configured with the ability to notify hosts (via host ports) and storage systems (via FEPs) of various I/O connectivity issues ("connectivity issues") identified by the switch, including, for example, congestion, hardware (HW) failures, path transmission failures, etc. Such notifications may indicate a device that is a source of the connectivity issue, for example, a host port (e.g., specified by a host port ID) or an FEP (specified by an FEP ID). However, the information included in such notifications may be limited to: 1) an identification of the issue; and 2) a specific, switch-defined type of identification of the source device, for example, a World Wide Name (WWN) of a host port or FEP in accordance with a Fibre Channel (FC) protocol. That is, such information may not include other information associated with the I/O information, including information about the I/O path on which the connectivity issue occurred. As a result, a user (e.g., IT administrator) may need to determine and compile other information relating to the reported connectivity issue to determine how to address the connectivity issue, and then take additional action to address the issue.

What may be desirable is to determine and compile information pertinent to a connectivity issue reported by a switch, in addition to an identification of the issue and a specific switch-defined type of identification of the source device, to report such additional information and to autonomously take action to address the connectivity issue.

Described herein are mechanisms and techniques for determining and compiling information pertinent to a connectivity issue reported by a switch, in addition to an identification of the issue and a specific switch-defined type of identification of the source device, and reporting such additional information. In some embodiments, action is autonomously taken to address the connectivity issue based on the additional information. Such mechanisms and techniques may be implemented on a storage system, another entity of a storage network, or a suitable combination thereof.

The additional information may include any of: a fabric name of the fabric on the I/O path on which the connectivity issue occurred; a host port ID (e.g., WWN) on the I/O path on which the connectivity issue occurred if the host port is not the source device reported by the switch; a name of the host port (i.e., a symbolic host port name, e.g., "Server A, Port 4" having symbolic meaning to a user); a host name; an FEP ID (e.g., WWN) on the I/O path on which the connectivity issue occurred if the FEP is not the source device reported by the switch; a name of the FEP that has a symbolic meaning to a user (e.g., "Director (Board) 1, Port 2"); a negotiated speed (i.e., bandwidth threshold) of the host port (i.e., host port speed (HP S)) on which the connectivity issue occurred; a negotiated speed (i.e., bandwidth threshold) of the FEP (i.e., front-end port speed (FPS)) on which the connectivity issue occurred; other information; and any suitable combination of the foregoing.

The additional information may be determined by the storage system, including querying a switch in response to the switch notifying the storage system of the I/O error, and the storage system accessing one or more data structures to determine additional information based on the initial information in the notification from the switch and information learned from querying the switch. The storage system may compile (e.g., including organizing and/or collating) the initial and additional information into report information, and report the report information to one or more users, for example, by displaying the information and/or sending a communication to the user on another device (e.g., host system, user device, etc.). The report information, including the initial reported information and additional information, may include any of: an identification of the connectivity issue; an indication of the device (e.g., host port or FEP) that the switch reported to be the source of the issue; a fabric name of the switch fabric on the I/O path on which the connectivity issue occurred; an indication of the host port ID on the I/O path on which the connectivity issue occurred; a name of the host port; a host name; an FEP on the I/O path on which the connectivity issue occurred; an FEP name; an HPS of the host port; an FPS of the FEP; other information; and any suitable combination of the foregoing.

In some embodiments, action may be autonomously taken, for example, by a storage system, based on the initial and additional information pertaining to an I/O. For example, the storage system may cause I/O communications on the I/O path to be at least temporarily diverted. For example, in response to receiving an I/O request in accordance with SCSI technology on the I/O path corresponding to the connectivity issue, the storage system may send a predefined check condition status code in accordance with SCSI technology to the host that causes the host system not to send additional I/O requests on the I/O path, at least temporarily, as described in more detail elsewhere herein. Instead of sending I/O requests along the I/O path, the host system (e.g., a multi-path driver (MP driver) thereof) may be configured to send I/O request along another available I/O path between the host system and the storage system, at least temporarily.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
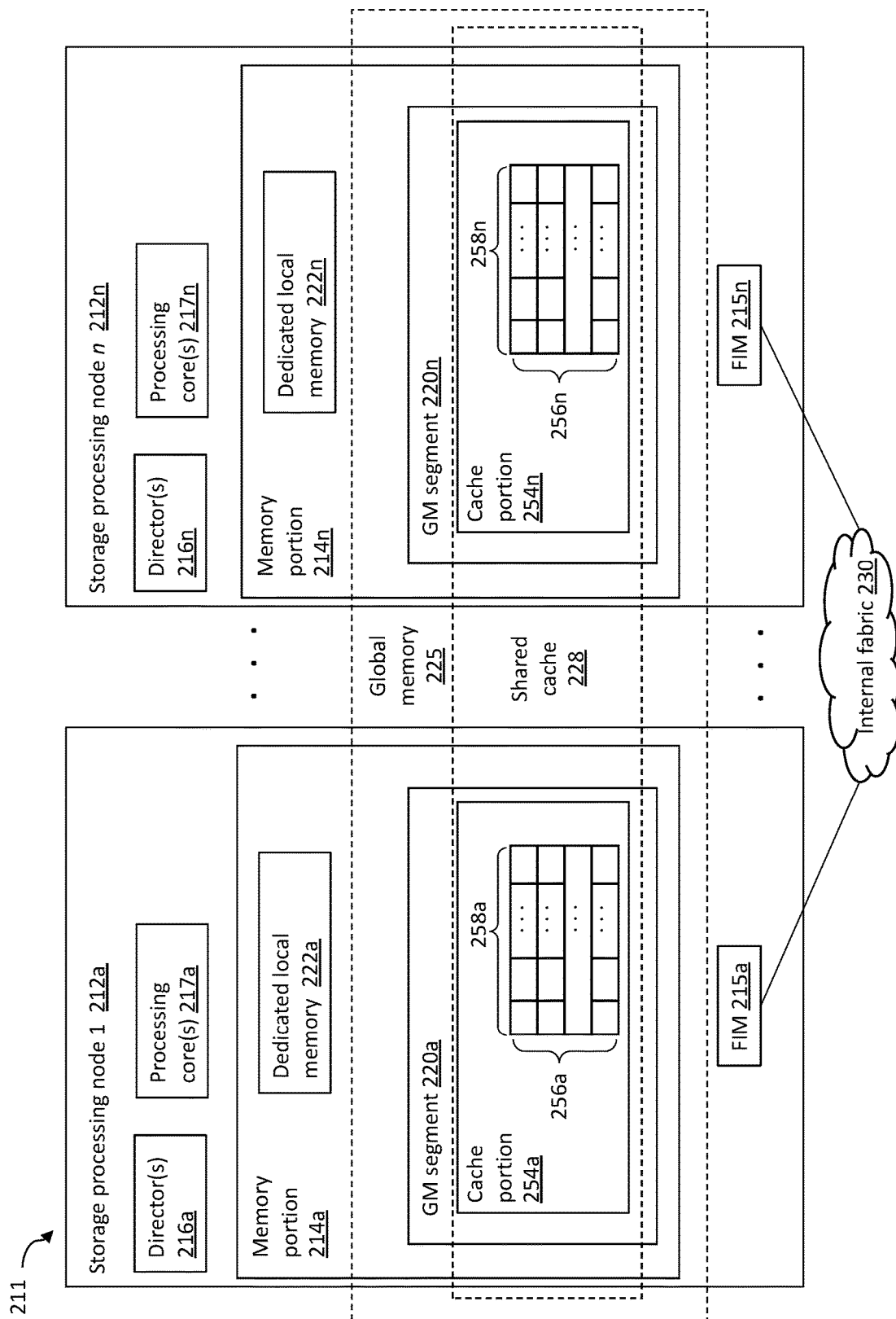
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an D3 fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25*b* and memory 25*a*, GM segment 220*a-n* and/or dedicated local memories 22*a-n*. Thus, storage system 20*a*, and storage system 620*a* described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
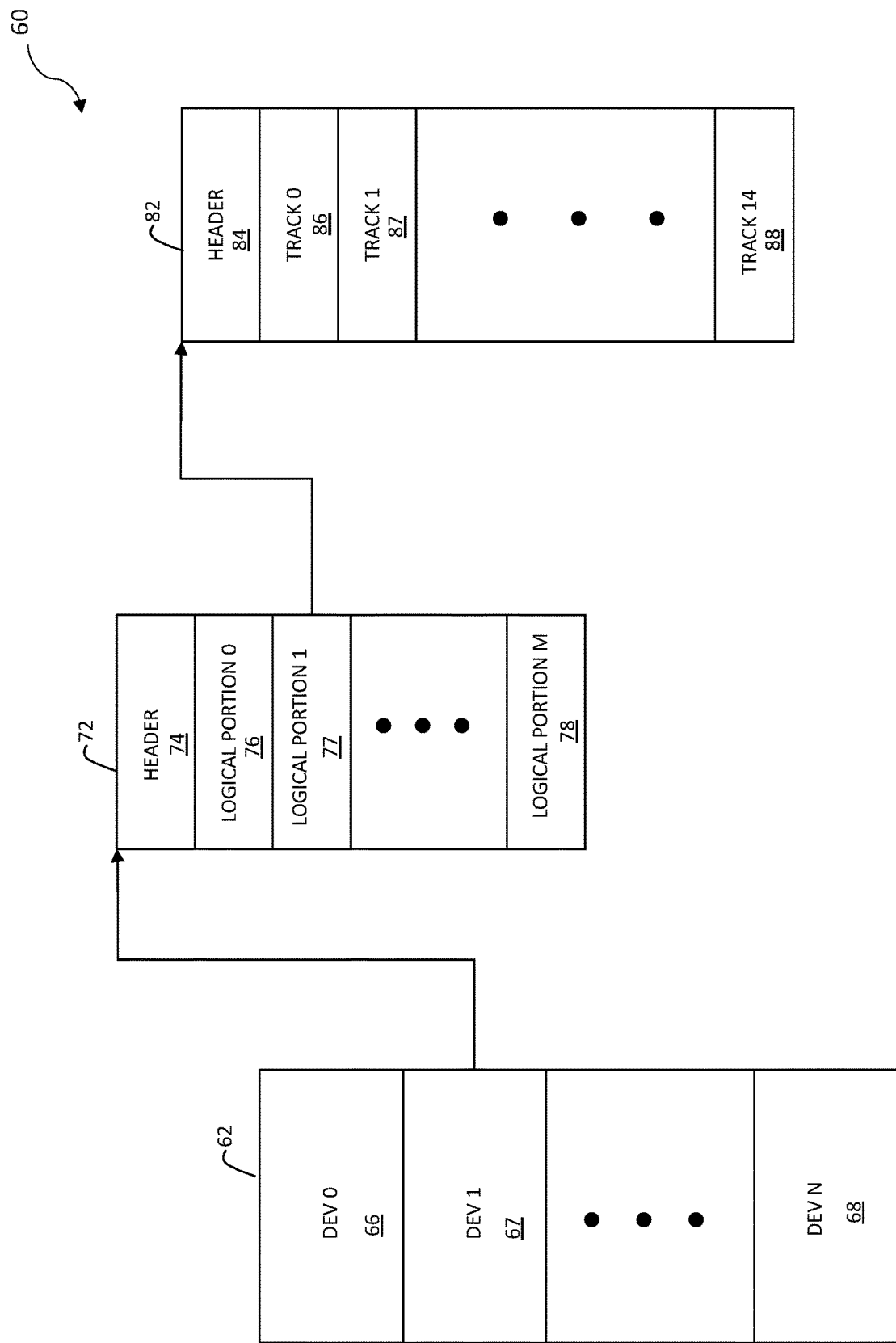
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20*a*) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a-n*. In addition, RA 40 and/or the BEs 23*a-n* may also use and locally store portions of the tables 62, 72, 72', 82 and 300. Other data structures may be stored in any of GM 25*b*, memory 25*a*, GM segment 220*a-n* and/or dedicated local memories 22*a-n*.

Figure 5:
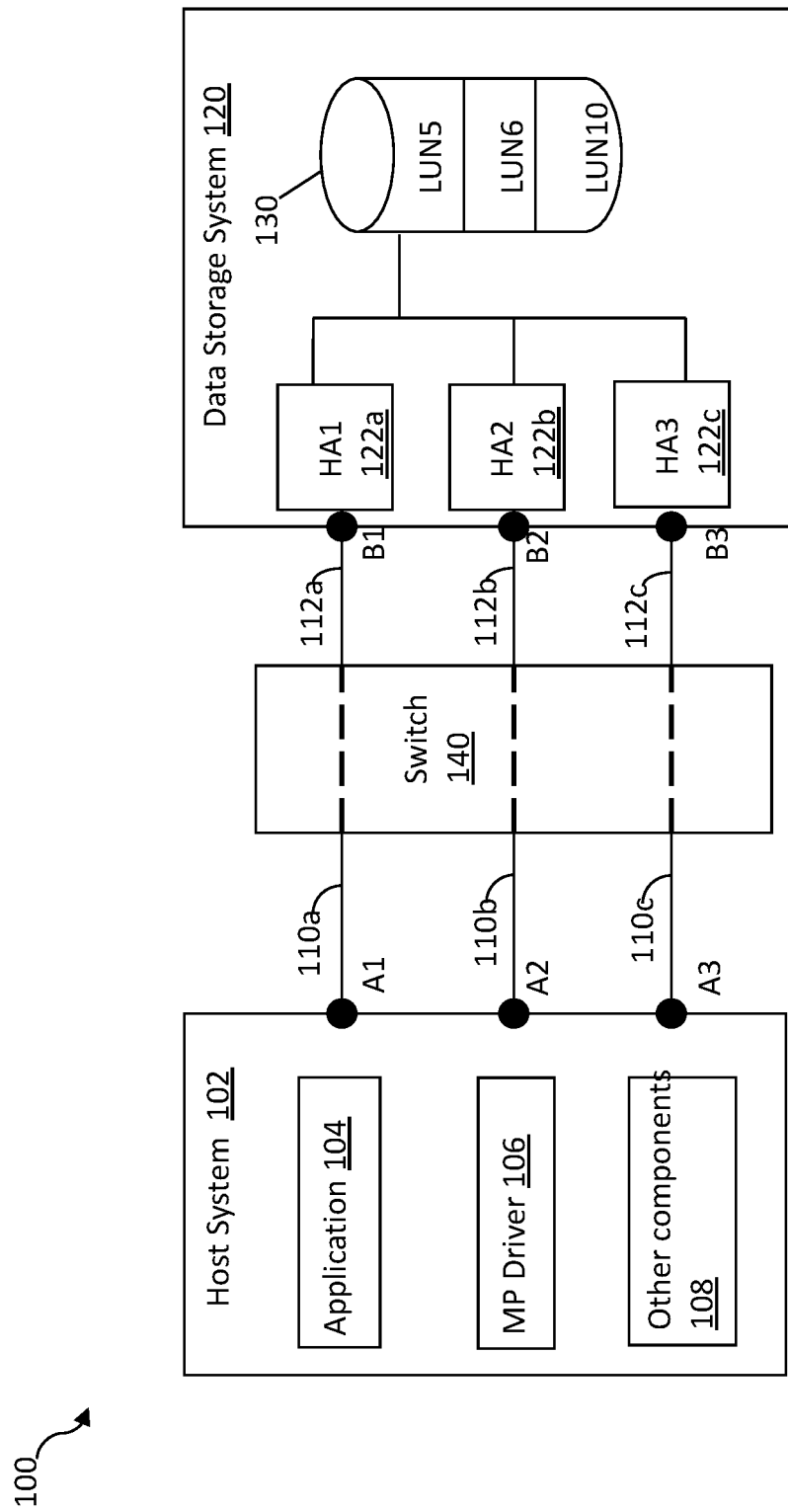
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters HA1, HA2 and HA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LSUs may be visible or exposed to the host system initiator through the target port of the data storage system.

Figure 7:
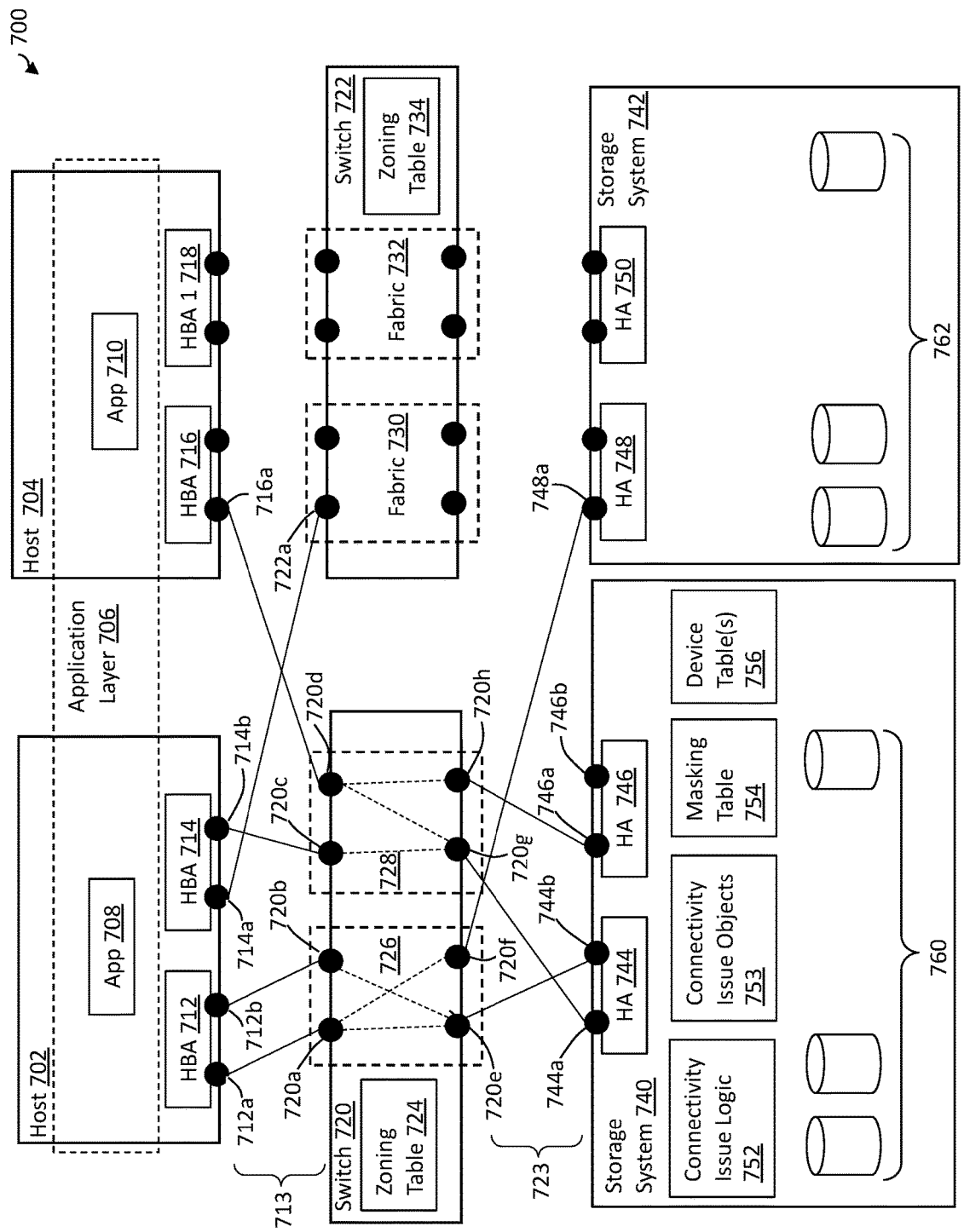
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712a, 712b, 714a and 714b. The portion of application layer 706 running on host 702 may include application 708 and one or more other applications. HBA 712 may include host ports 712a and 712b, and HBA 714 may include host ports 714a and 714b. HBAs 712 and 714 each may be separate discrete logical or physical components of host 702, and host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and fabric port (e.g., in accordance with a technology standard (e.g., FC)) as illustrated in FIG. 7. That is, in some embodiments, each fabric port is dedicated to one host port. FIG. 7 illustrates host ports 712a, 712b, 714a, 714b and 716a connected to fabric ports over physical connections 713 in which there is only one physical connection 713 between each host port and each fabric port.

Host 704 may include any of: a portion of the application layer at 706; application 710; HBAs 716 and 718; and multiple host ports including host port 716a of HBA 716.

Switch 720 may include any of: zoning table 724, fabrics 726 and 728; ports 720a-h; other components; or any suitable combination of the foregoing. Each of ports 720a-h ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7. That is, in some embodiments, each SSP is dedicated to an FEP. FIG. 7 illustrates FEPs 744a, 744b and 746a connected to SSPs 720g, 720a and 720h, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712a, 712b, 714a, 714b and 716a, are enabled to communicate with which FEPs, for example, 744a, 744b, 746a, 746b and 748a. Zoning tables are described in more detail elsewhere herein. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which I/O connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

The switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

The storage system 740 may include any of: connectivity issue logic 752; connectivity issue objects 753; masking table 754; device table(s) 756; HAs 744 and 746; FEPs 744a, 744b, 746a and 746b; BEs (not shown); physical storage devices 760; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The connectivity issue logic 752 may be configured with logic (software, hardware, firmware or a combination thereof) to perform one or processes in accordance with managing connectivity issues on a storage network, for example, one or more of the methods described herein, or sub-steps thereof, including method 1100. The connectivity issue logic 752 may be configured to use the connectivity issue logic objects 753 to manage connectivity issues for I/O connections on a storage network. The connectivity issue logic objects 753 may include one or more objects (e.g., data structures) for managing connectivity issues for I/O paths on a storage network including, for example, any of data structures 800, 900 or 1000, described in more detail elsewhere herein. The connectivity issue logic 752 or components thereof may be implemented as part of one or more FAs 21a-n and/or management module 22 described in relation to FIG. 1.

The storage system 742 may include any of the same or similar components as storage system 740, including HA 748 and FEP 748a thereof, physical storage devices 762, connectivity issue logic (not shown); and connectivity issue objects (not shown). In some embodiments, storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

Figure 8:
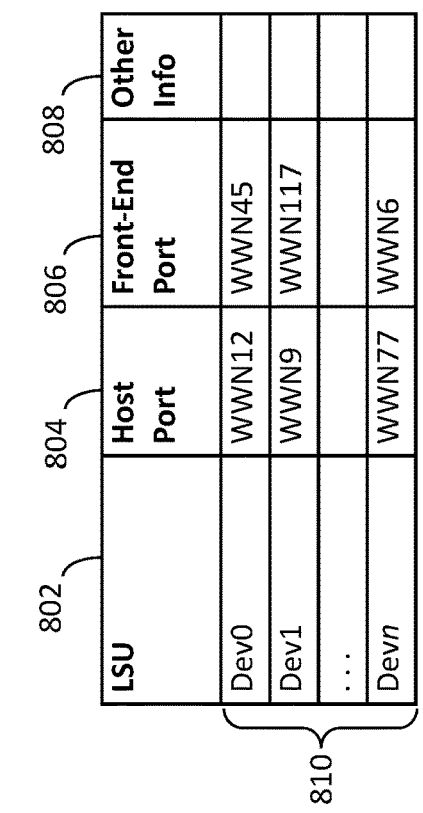
FIG. 8 is a block diagram illustrating an example of a data structure defining port connectivity permissions between a storage system and one or more host systems, according to embodiments of the invention.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Other information, for example, the host and/or the HBA associated with the host port and/or the FA associated with the FEP may be specified in column 808. A data structure other than a table, for example, a linked list and/or object-oriented data structure, may be used to record the same information.

To properly configure I/O connectivity between host ports, FEPs and LSUs, it may be necessary to know the permissible I/O paths between host ports and FEPs (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

Figure 9:
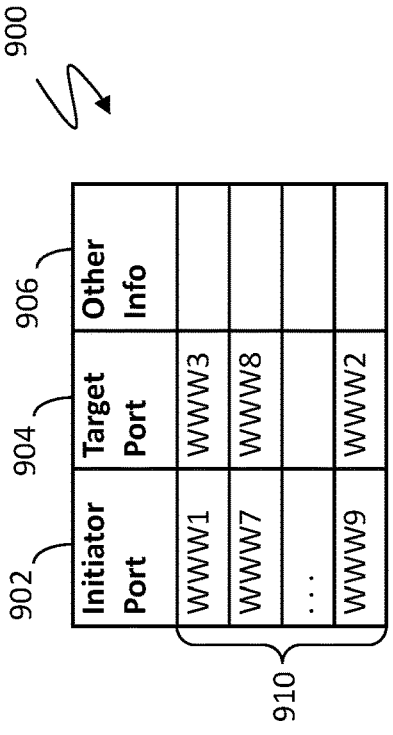
FIG. 9 is a block diagram illustrating an example of a data structure defining port connectivity permissions for a switch, according to embodiments of the invention.

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, which may include data structure 1000 described in more detail elsewhere herein. It should be appreciated that one or more of the data structures 62, 72, 72', 82, 800, 900 and 1000, or information contained therein, may be combined in one or more data structures, either as a variation of the one of the foregoing data structures or in a different data structure altogether.

Figure 10:
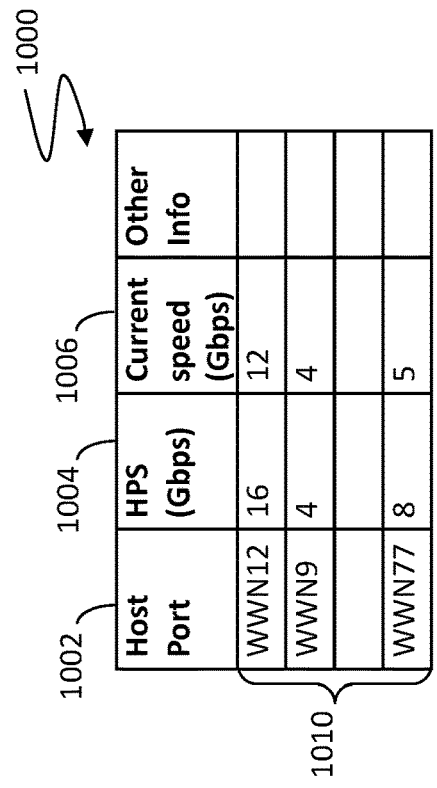
FIG. 10 is a block diagram illustrating an example of a data structure for maintaining host port speeds for I/O paths corresponding to an FEP, according to embodiments of the invention.

FIG. 10 is a block diagram illustrating an example of a data structure 1000 for maintaining host port speeds (HPSs; i.e., host port bandwidth thresholds (BWTs)) for I/O paths corresponding to an FEP, according to embodiments of the invention. Other embodiments of a data structure for maintaining HPSs corresponding to an FEP, for example, variations of the data structure 1000, are possible and are intended to fall within the scope of the invention. Data structure 1000 may be referred to herein as a HPS table.

The HPS table 1000 may include a plurality of entries 1010, each entry representing a I/O path corresponding to an FEP. Each entry may include a host port ID (e.g., WWN) in host port ID column 1002, where the combination of the FEP (specific to the HPS table) and the host specified by the host port ID of the entry define an I/O path. Each entry also may specify a negotiated HPS for the I/O path (e.g., in units of Gigabits per second) in the negotiated HPS column 1004; a current HPS of the I/O path in current HPS column 1006; and other information.

It should be appreciated that, in some embodiments, rather than having a separate HPS table 1000 for each FEP of a storage system, a HPS table may be configured to represent a plurality (e.g., all) FEPs on a storage system, where each entry 1010 also specifies an FEP ID (e.g., WWN) in an FEP ID column (not shown), such that the FEP ID and host port ID specified in each entry defines the I/O path represented by the entry. Further, such an HPS table may include FSTs for each FEP. The HPS table 1000 and/or variations thereof may be used to manage bandwidth consumption and congestion on I/O paths, as described in more detail in U.S. patent application Ser. No. 16/927,045, "Managing IO Path Bandwidth," filed Jul. 13, 2020, to Davidson et al. ("Davidson"), the entire contents of which are hereby incorporated by reference.

Figure 11:
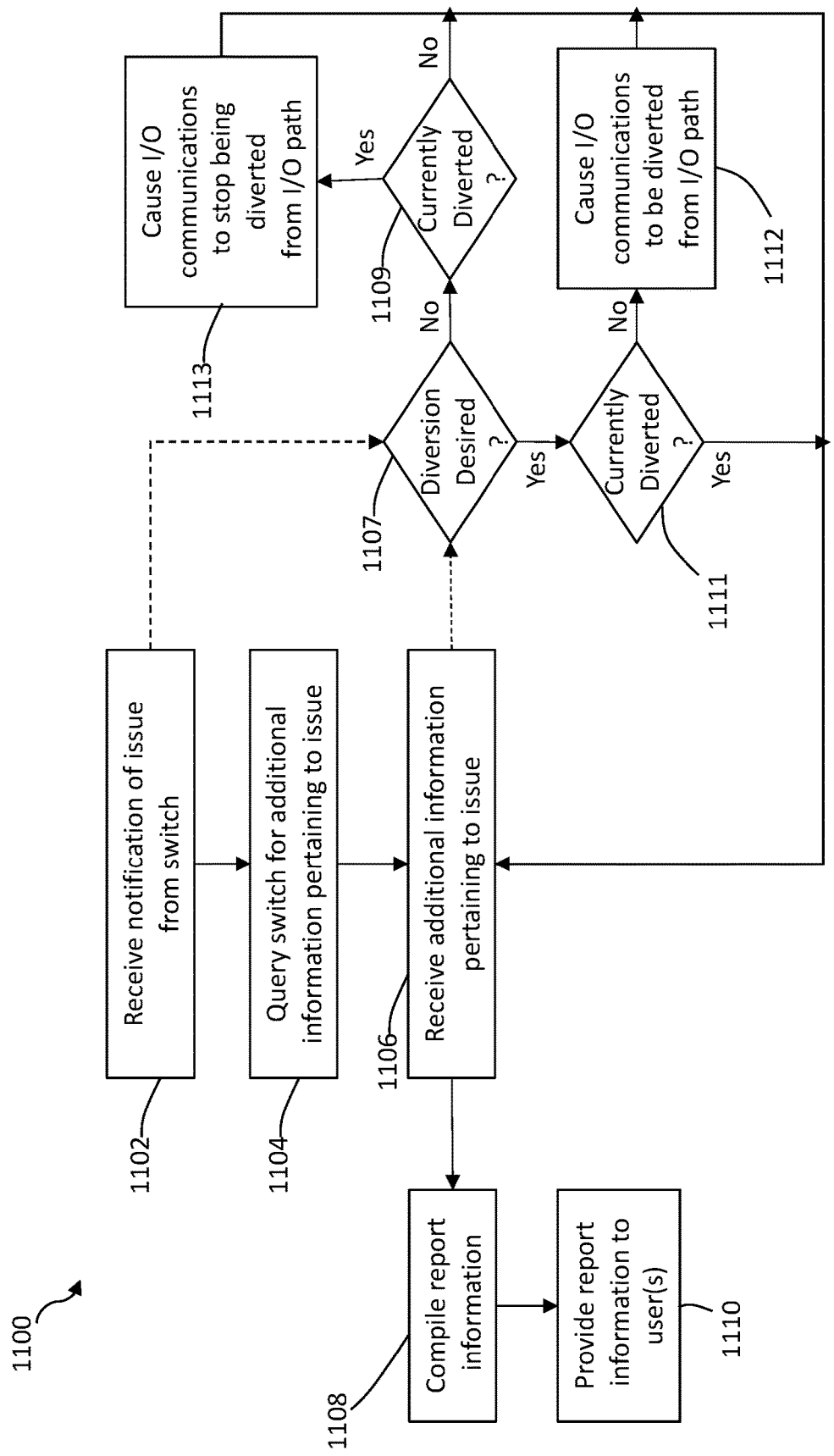
FIG. 11 is a flowchart illustrating an example of a method of managing an I/O connectivity issue in response to a switch notification, according to embodiments of the invention.

FIG. 11 is a flowchart 1100 illustrating an example of a method of managing an I/O connectivity issue in response to a switch notification, according to embodiments of the invention. Other embodiments of a method of managing an I/O connectivity issue in response to a switch notification, for example, variations of the method 1100, are possible and are intended to fall within the scope of the invention. The method may be implemented on the storage system 740, for example, by connectivity issue logic 752.

In a step 1102, a notification of a connectivity issue may be received at the storage system, e.g., from a switch. For example, the storage system may monitor for notifications from the switch in accordance with a Fibre Channel (FC) protocol, and the switch may send a fabric performance impact notification (FPIN) extended link service (ELS) command to the storage system (e.g., an FEP thereof) that indicates congestion on the FEP link, or that an FEP link is faulty, or another connectivity issue, using an appropriate type-length-value (TLV) descriptor tag or by other means.

In a step 1104, the switch may be queried, for example, by the storage system, to determine additional information in relation to the connectivity issue about which the storage system was notified by the switch. In a step 1106, the additional information may be received, e.g., by the storage system, in response to the one or more queries made to the switch. It should be appreciated that the additional information may be received in one or more communications in response to the one or more queries. Further, one or more data structures (e.g., connectivity issue objects 753, including nay of data structures 800, 900 and 1000 among others) may be accessed to obtain additional information, for example, based on the initial connectivity issue information received in the switch notification and/or additional information determined from the queries. The additional information may include any of: a fabric name of the switch fabric on the I/O path on which the I/O issue occurred; a host port ID (e.g., WWN) on the I/O path on which the I/O issue occurred if the host port is not the source device reported by the switch; a name of the host port (i.e., a symbolic host port name, e.g., "Sales Server, Port 1" having symbolic meaning to a user); a host name; an FEP ID (e.g., WWN) on the I/O path on which the I/O issue occurred if the FEP is not the source device reported by the switch; a name of the FEP that has a symbolic meaning to a user (e.g., "Storage Processor 3, Port 4"); an HPS of the host port of the I/O path on which the I/O issue occurred; an FPS of the FEP of the I/O path on which the I/O issue occurred; other information; and any suitable combination of the foregoing.

In a step 1108, the initial information and additional information may be compiled into report information. For example, such information may be combined, organized, collated and/or formatted in a predefined manner. In a step 1110, the report information may be provided to one or more users, for example, an IT professional, storage administrator, network administrator, host system administrator, host applications administrator, consultant, customer, other types of users; or any suitable combination of the foregoing. The report information may be displayed, e.g., on a monitor or other display device connected to the storage system, and may be sent to one or more other devices on the storage network (e.g., a host system) or external device (e.g., a cell phone or other user device).

The report information, including the initial information from the switch notification and the additional information determined, may include any of: an identification of the I/O issue; an indication of the device (e.g., host port or FEP) that the switch reported to be the source of the issue; a fabric name of the fabric on the I/O path on which the I/O issue occurred; an indication of the host port ID on the I/O path on which the I/O issue occurred; a name of the host port; a host name; an FEP on the I/O path on which the I/O issue occurred; an FEP name; an HPS of the host port; an FPS of the FEP; other information; and any suitable combination of the foregoing.

The HPS of an I/O path may be determined from HST table 1000. The HST and FPS of an I/O path may be determined when configuring a storage network (e.g., storage network 700). Configuring a storage network may include, for example, connecting host ports to SHPs and FEPs to SSPs, defining zones, provisioning storage, masking LSUs to FEPs and host ports (as described in more detail elsewhere herein), etc. During the configuration process, or in response to new components being added to the storage network, or during recovering from a failure, hosts and storage systems may separately log into switches. During the log-in process between the host and the switch, for each host port of a host that is physically connected to an SHP, the host may negotiate an HST (i.e., a maximum bandwidth threshold or maximum throughput) for the host port for the physical link (hereinafter "link") between the host port and the SHP (i.e., fabric port) to which the host port is connected by the link. Also, during the log-in process between the storage system and the switch, independent of the log-in process between the host and the switch, for each FEP of a storage system physically connected to an SSP of the switch, the storage system may negotiate the FST for the link between the FEP and the SSP to which the host port is connected by the link. For a given I/O path, as a result of the foregoing independent HST and FST negotiations, the negotiated HST and the negotiated FST may be different. An HST being less than an FST on an I/O path may cause a slow drain issue that leads to congestion on an I/O path, for example, as described in Davidson.

Embodiments of the invention in which the storage system determines the additional information and reports such information may be advantageous over relying on information reported by a switch because a storage system may have a broader view of the storage network than a single switch, for example, if the storage network has multiple switches and/or fabrics. That is, the storage system may be communicatively coupled to multiple switches and/or fabrics and be able to query each of such switches to get a more complete picture of the connectivity, e.g., including the active, passive and dead I/O paths, between host systems and the storage system. Further, the storage system may have access to information to which a switch or other network component does not have access, for example, information resulting from host systems logging in and registering with the storage system as described in more detail elsewhere herein.

Before, after or concurrently to the performance of the steps 1104, 1106, 1108 and 1110 (e.g., after performance of the step 1102 and/or the step 1106), one or more actions may be taken (e.g., autonomously) based on the initial information and/or additional information, including, for example, causing I/O communications to be diverted from the I/O path associated with the connectivity issue, at least temporarily. For example, in a step 1107 it may be determined whether diverting /O communications from the I/O path is desired based on the initial information and/or additional information, for example, in accordance with predefined rules configured on the storage system. If it is determined that such diversion is desired, then in a step 1111 it may be determined whether I/O communications on the I/O path already are being diverted, for example, as a result of a previous performance of a step 1112.

If it is determined in the step 1111 that I/O communication are not currently being diverted, then in the step 1112, I/O communications may be caused to be diverted from the I/O path associated with the connectivity issue, at least temporarily. For example, the storage system may be configured to send, in response to receiving an I/O request in accordance with SCSI technology on the I/O path corresponding to the I/O issue, a predefined check condition status code (e.g., 05/25) in accordance with SCSI technology to the host. In response, the host system may not send additional I/O requests on the I/O path, at least temporarily. For example, in some embodiments, in response to receiving the check condition status code in response to receiving an I/O request, the host (e.g., an MP driver) may send a SCSI Test Unity Ready (TUR) or Inquiry command (or the like) to the storage system regarding the I/O path for which the check condition code was sent. The storage system may be configured to not send a check condition in response to a TUR or Inquiry command. The host (e.g., MP driver) may be configured to interpret the non-check condition response(s) to a TUR or Inquiry command in combination with having received a check condition in response to an I/O request as meaning that the I/O path is not necessarily a dead path (i.e., not completely failed or disconnected), but rather that something is not quite right with the path. The host system may be configured to thus treat the I/O path as a passive path that is not dead, but on which I/O requests are not to be transmitted at least temporarily.

Instead of sending I/O requests along the I/O path that has been determined to be a passive path, the host system (e.g., the MP driver thereof) may be configured to send I/O request along another available I/O path between the host system and the storage system, at least temporarily. The host system may be configured to try sending an I/O request again on the passive I/O path after a certain predefined period of time has elapsed and/or if another I/O path fails (e.g., if no other active I/O paths remain available). If the I/O request is successful (e.g., no check condition received an no other indication of failure), the host system may resume transmitting I/O requests on the previously passive I/O path.

After the performance of the step 1112, or if it is determined in the step 1111 that I/O communication are currently being diverted, the method 1100 may return to the step 1106, during performance of which addition information may be received.

It should be appreciated that actions being taken also may include causing I/O communications to stop being diverted on an I/O path based on additional information received in the step 1106. For example, if it is determined in the step 1107 that is it not desired that I/O communications be diverted from the I/O path based on the initial and/or addition information, then in a step 1109 it may be determined whether I/O communications are currently being diverted. If they are currently being diverted, then, in a step 1113, I/O communications may be caused to stop being diverted from the I/O path, for example, by no longer sending predefined check condition status codes in response to I/O requests on the I/O path (e.g., when the I/O path is tried again by an MP driver as described in more detail elsewhere herein).

After the performance of the step 1113, or if it is determined in the step 1109 that I/O communication are not currently being diverted, the method 1100 may return to the step 1106, during performance of which addition information may be received.

It should be appreciated that other actions may be taken based on the initial information received in the switch notification and/or additional information determined. For example, the initial and additional information, in particular the determined HPS and FPS, may be used to adjust bandwidth thresholds on I/O paths between a host system and storage system, e.g., to address a slow drain issue, for example, as described in Davidson.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 1100 or parts thereof, may be implemented using one or more of the systems and/or data structures described in relation to FIGS. 1-10 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a host system, a switch and a data storage system, a method comprising:

the switch identifying a connectivity issue associated with I/O communications between the data storage system and the host system;

responsive to the switch identifying the connectivity issue, receiving at the data storage system a notification from the switch specifying the connectivity issue associated with I/O communications between the storage system and the host system;

responsive to the data storage system receiving the notification from the switch specifying the connectivity issue, the data storage system querying the switch for additional information pertaining to the connectivity issue identified in the notification from the switch;

responsive to the data storage system performing said querying the switch for the additional information pertaining to the connectivity issue identified in the notification from the switch, the data storage system receiving from the switch the additional information pertaining to the connectivity issue;

compiling the additional information into issue report information; and communicating the issue report information to a user of the data storage network.

2. The method of claim 1, further comprising:
for an I/O path between the host system and the data storage system, associated with the connectivity issue, the data storage system causing I/O communication on the I/O path to be at least temporarily diverted to another I/O path based on the connectivity issue and additional information.

3. The method of claim 2, wherein the data storage system causing I/O communication on the I/O path to be diverted includes the data storage system sending a predefined check condition status code in accordance with SCSI technology to the host system in response to an I/O communication, and wherein the method further includes:

the host system receiving the predefined check condition status code regarding the I/O path; and responsive to receiving the predefined check condition status code, a multipath driver of the host system selecting an alternative available I/O path over which to send one or more subsequent I/O communications to the data storage system.

4. The method of claim 1, wherein the additional information includes a negotiated speed of at least one of: a host system port; and a storage system port.

5. The method of claim 1, wherein the additional information includes an identifier of a fabric or virtual storage area network on an I/O path between the host system and the data storage system associated with the connectivity issue.

6. The method of claim 1, wherein the additional information includes an identifier of a host port on an I/O path between the host system and the data storage system associated with the connectivity issue.

7. The method of claim 1, wherein the data storage system controls performance of the communicating.

8. A data storage system of a data storage network including a host system, a switch and the data storage system, the data storage system including executable logic that implements a method including:

the switch identifying a connectivity issue associated with I/O communications between the data storage system and the host system;

responsive to the switch identifying the connectivity issue, receiving at the data storage system a notification from the switch specifying the connectivity issue associated with I/O communications between the storage system and the host system;

responsive to the data storage system receiving the notification from the switch specifying the connectivity issue, the data storage system querying the switch for additional information pertaining to the connectivity issue identified in the notification from the switch;

responsive to the data storage system performing said querying the switch for the additional information pertaining to the connectivity issue identified in the notification from the switch, the data storage system receiving from the switch the additional information pertaining to the connectivity issue;

compiling the additional information into issue report information; and communicating the issue report information to a user of the data storage network.

9. The data storage system of claim 1, wherein the method further includes:

for an I/O path between the host system and the data storage system, associated with the connectivity issue, the data storage system causing I/O communication on the I/O path to be at least temporarily diverted to another I/O path based on the connectivity issue and additional information.

10. The data storage system of claim 9, wherein the data storage system causing I/O communication on the I/O path to be diverted includes the data storage system sending a predefined check condition status code in accordance with SCSI technology to the host system in response to an I/O communication, and wherein the method further includes:

the host system receiving the predefined check condition status code regarding the I/O path; and responsive to receiving the predefined check condition status code, a multipath driver of the host system selecting an alternative available I/O path over which to send one or more subsequent I/O communications to the data storage system.

11. The data storage system of claim 8, wherein the additional information includes a negotiated speed of at least one of: a host system port; and a storage system port.

12. The data storage system of claim 8, wherein the additional information includes an identifier of a fabric or virtual storage area network on an I/O path between the host system and the data storage system associated with the connectivity issue.

13. The data storage system of claim 8, wherein the additional information includes an identifier of a host port on an I/O path between the host system and the data storage system associated with the connectivity issue.

14. For a data storage network including a host system, a switch and a data storage system, computer-readable media having software stored thereon, the software comprising:

executable code that controls the switch to identify a connectivity issue with I/O communications between the data storage system and the host system;

executable code that, responsive to the switch identifying the connectivity issue, controls the data storage system to receive a notification from the switch specifying the connectivity issue associated with I/O communications between the storage system and the host system;

executable code that, responsive to the data storage system receiving the notification from the switch specifying the connectivity issue, controls the data storage system to query the switch for additional information pertaining to the connectivity issue identified in the notification from the switch;

executable code that, responsive to the data storage system querying the switch for the additional information pertaining to the connectivity issue identified in the notification from the switch, controls the data storage system to receive from the switch the additional information pertaining to the connectivity issue;

executable code that compiles the additional information into issue report information; and executable code that communicates the issue report information to a user of the data storage network.

15. The computer-readable media of claim 14, wherein the software further comprises:

for an I/O path between the host system and the data storage system, associated with the connectivity issue, executable code that controls the data storage system causing I/O communication on the I/O path to be at least temporarily diverted to another I/O path based on the connectivity issue and additional information.

16. The computer-readable media of claim 15, wherein the executable code that controls the storage system causing I/O communication on the I/O path to be diverted includes other executable code causing the storage system to send a predefined check condition status code in accordance with SCSI technology to the host system in response to an I/O communication.

17. The computer-readable media of claim 14, wherein the additional information includes a negotiated speed of at least one of: a host system port; and a storage system port.

18. The computer-readable media of claim 14, wherein the additional information includes an identifier of a fabric or virtual storage area network on an I/O path between the host system and the data storage system associated with the connectivity issue.

19. The computer-readable media of claim 14, wherein the additional information includes an identifier of a host port on an I/O path between the host system and the data storage system associated with the connectivity issue.

20. The computer-readable media of claim 14, wherein the executable code that communicates executes on the data storage system.

* * * * *